United States Patent
Lee et al.

(10) Patent No.: US 9,843,637 B2
(45) Date of Patent: Dec. 12, 2017

(54) METHOD AND APPARATUS FOR CONTROLLING TRANSMISSION AND RECEPTION OF DATA AMONG PLURALITY OF DEVICES IN COMMUNICATION SYSTEM

(71) Applicant: Samsung Electronics Co., Ltd, Gyeonggi-do (KR)

(72) Inventors: Ho-Jun Lee, Gyeonggi-do (KR); Jung-Baek Ha, Seoul (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 251 days.

(21) Appl. No.: 14/646,361

(22) PCT Filed: Nov. 20, 2013

(86) PCT No.: PCT/KR2013/010556
§ 371 (c)(1),
(2) Date: May 20, 2015

(87) PCT Pub. No.: WO2014/081186
PCT Pub. Date: May 30, 2014

(65) Prior Publication Data
US 2015/0304424 A1    Oct. 22, 2015

(30) Foreign Application Priority Data

Nov. 20, 2012 (KR) .................. 10-2012-0131848

(51) Int. Cl.
*G06F 15/16* (2006.01)
*H04L 29/08* (2006.01)
(Continued)

(52) U.S. Cl.
CPC ........ *H04L 67/125* (2013.01); *H04L 41/0803* (2013.01); *H04W 72/04* (2013.01); *H04W 84/18* (2013.01)

(58) Field of Classification Search
CPC .. H04L 67/125; H04L 41/0803; H04W 72/04; H04W 84/18
See application file for complete search history.

(56) References Cited

U.S. PATENT DOCUMENTS

2002/0086678 A1   7/2002   Salokannel et al.
2006/0245226 A1   11/2006  Stewart
(Continued)

FOREIGN PATENT DOCUMENTS

| KR | 10-2012-0074254 | 7/2012 |
| WO | WO 2012/015238 A2 | 2/2012 |
| WO | WO 2012/150815 A2 | 11/2012 |

OTHER PUBLICATIONS

International Search Report dated Feb. 14, 2014 in connection with International Patent Application No. PCT/KR2013/010556, 5 pages.

(Continued)

*Primary Examiner* — Krisna Lim

(57) ABSTRACT

A method for controlling the transmission and reception of data among a plurality of devices in a communication system comprises the steps of: enabling a master device as one of the plurality of devices to determine a channel to be assigned to each slave device connected in series thereto; and transferring channel information of each determined slave device to the slave devices.

26 Claims, 16 Drawing Sheets

(51) Int. Cl.
H04W 72/04      (2009.01)
H04L 12/24      (2006.01)
H04W 84/18      (2009.01)

(56) References Cited

U.S. PATENT DOCUMENTS

2008/0084769 A1    4/2008    RaghuRam et al.
2008/0091862 A1    4/2008    Hiraka
2012/0099431 A1    4/2012    Hou et al.
2012/0137157 A1    5/2012    Olsson et al.
2013/0128761 A1    5/2013    Kang et al.
2014/0057670 A1    2/2014    Lim et al.

OTHER PUBLICATIONS

Written Opinion of International Searching Authority dated Feb. 14, 2014 in connection with International Patent Application No. PCT/KR2013/010556, 6 pages.

Cortina Systems Inc., et al., "Interlaken Protocol Definition: A Joint Specification of Cortina Systems and Cisco Systems", Revision 1.2, Oct. 7, 2008, 52 pages.

METHOD AND APPARATUS FOR CONTROLLING TRANSMISSION AND RECEPTION OF DATA AMONG PLURALITY OF DEVICES IN COMMUNICATION SYSTEM

CROSS-REFERENCE TO RELATED APPLICATION(S)

The present application claims priority under 35 U.S.C. §365 to International Patent Application No. PCT/KR2013/010556 filed Nov. 20, 2013, entitled "METHOD AND APPARATUS FOR CONTROLLING TRANSMISSION AND RECEPTION OF DATA AMONG PLURALITY OF DEVICES IN COMMUNICATION SYSTEM". International Patent Application No. PCT/KR2013/010556 claims priority under 35 U.S.C. §365 and/or 35 U.S.C. §119(a) to Korean Patent Application No. 10-2012-0131848 filed Nov. 20, 2012, and which are incorporated herein by reference into the present disclosure as if fully set forth herein.

TECHNICAL FIELD

The present invention relates to a method and an apparatus for controlling a flow for transmission and reception of data in communication systems.

BACKGROUND ART

Each of a plurality of devices constituting a general communication system has a plurality of physical lines (hereinafter, referred to "lanes") for input and output of data between the same. In addition, the devices each may adjust the number of lanes to be used according to the amount of data to be transmitted. For example, one of the devices, which operate in a power saving mode, may transmit and receive data using some of the lanes. In addition, another of the devices, which operates in a normal mode, may transmit and receive data using all of the lanes.

At this time, as the number of devices that are connected to the lanes of a single device increases, a data transmission rate of each lane decreases, whereas the total amount of transmission data of the device increases. At this time, the increased amount of transmission data is considerably limited. Furthermore, in the case where the data transmission between the devices is made sporadically, if the number of devices is increased, the data transmission rate of each lane tends to decrease as well.

Therefore, a lane operation method of the device, by which the amount of transmission data can be increased without a decrease in the data transmission rate, is required.

DETAILED DESCRIPTION OF THE INVENTION

Technical Problem

The present invention provides a method and an apparatus for controlling transmission and reception of data between a plurality of devices.

Technical Solution

In accordance with an aspect of the present invention, there is provided a method for controlling the transmission and reception of data between a plurality of devices in a communication system, comprising: enabling a master device as one of the plurality of devices to determine a channel to be assigned to each slave device connected in series thereto; and transferring the determined channel information for each slave device to the slave devices.

In accordance with another aspect of the present invention, there is provided a method for controlling the transmission and reception of data between a plurality of devices in a communication system, comprising: receiving channel information for slave devices that are connected with a master device of the plurality of devices, the channel information assigned by the master device; and if the channel information includes its own identifier, assigning a channel corresponding to the channel information, and transferring the channel information to a device that is connected to a subsequent end.

In accordance with another aspect of the present invention, there is provided a master device for controlling the transmission and reception of data between remaining devices of a plurality of devices in a communication system, comprising: a channel determination unit that determines channels to be assigned to slave devices that are connected with the master device in series; and a transmitting/receiving unit that transfers the determined channel information for each slave device to the slave devices.

In accordance with another aspect of the present invention, there is provided a slave device for controlling the transmission and reception of data between a plurality of devices in a communication system, comprising: a transmitting/receiving unit that receives channel information for slave devices that are connected in series with a master device as one of the plurality of devices, the channel information assigned by the master device; and a controller that, if the channel information includes its own identifier, assigns a channel corresponding to the channel information, and controls the transmitting/receiving unit to transfer the channel information to a device that is connected with a subsequent end.

Advantageous Effects

According to the present invention, in transmitting and receiving data between devices, a transmitting device may control a flow according to a status of a receiving device that receives the data, to thereby increase the total amount of transmission data of the corresponding device without lowering a data transmission rate.

MODE FOR CARRYING OUT THE INVENTION

Figure 1A:
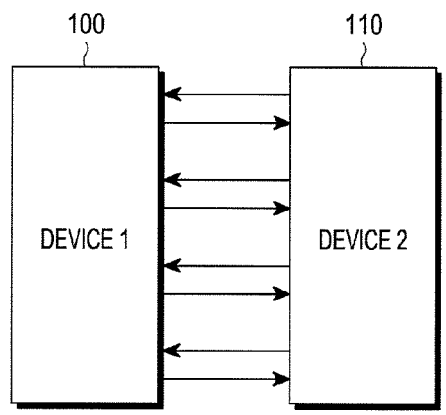
FIG. 1a illustrates an example of operating lanes of a device 1 (100) that is connected with a single device.

Hereinafter, operation principles of exemplary embodiments of the present disclosure will be described in detail with reference to accompanying drawings. Like reference numerals designate like components in the drawings where possible even though components are shown in different drawings. In the following description of the present disclosure, a detailed description of related known functions or configurations will be omitted so as not to obscure the subject of the present disclosure. The terms which will be described below are terms defined in consideration of the functions in the present disclosure, and may be different according to users, intentions of the users, or customs. Therefore, the definitions of the terms should be determined based on the contents throughout the specification.

FIGS. 1a to 1d are diagrams to show general examples of using lanes between devices of general wireless communication systems. Here, for example, device 1 (100) that has four pairs of lanes is disclosed. Each pair of lanes is comprised of a transmission lane and reception lane. In addition, FIGS. 1a to 1d illustrate examples of using the lanes of the device 1 (100) depending on the number of devices that are connected thereto, on the basis of the device 1 (100).

FIG. 1a illustrates an example of operating lanes of the device 1 (100) that is connected with a single device.

Referring to FIG. 1a, for example, the lanes of the device 1 (100) are mapped with the lanes of the device 2 (110) one to one.

Figure 1B:
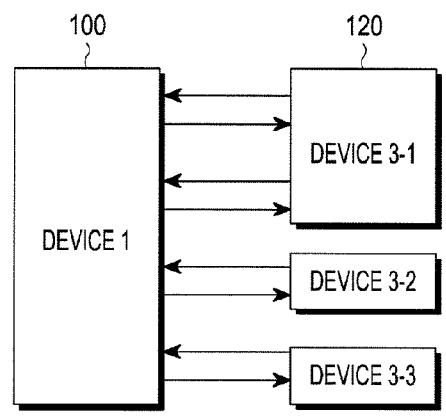
FIG. 1b illustrates an example of operating lanes of a device 1 (100) that is connected with three devices.

FIG. 1b illustrates an example of operating the lanes of the device 1 (100) that is connected with three devices.

Referring to FIG. 1b, for example, two pairs of lanes of all pairs of lanes included in the device 1 (100) are one-to-one-mapped with two pairs of lanes included in a device 3-1 (120). In addition, the remaining two pairs of lanes included in the device 1 (100) are mapped with each of a device 3-2 (122) and a device 3-3 (124) one to one.

Figure 1C:
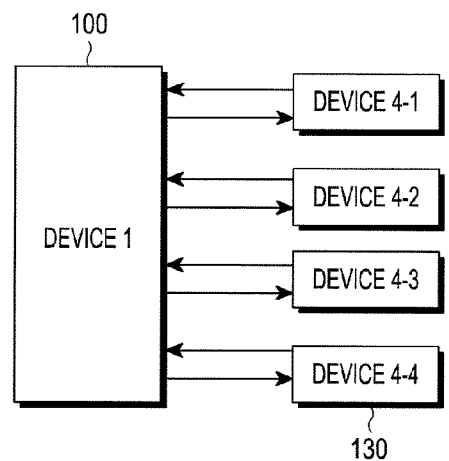
FIG. 1c illustrates an example of operating lanes of a device 1 (100) that is connected with four devices.

FIG. 1c illustrates an example of operating lanes of the device 1 (100) that is connected with four devices.

Referring to FIG. 1c, for example, the device 1 (100) is comprised of four pairs of lanes. In addition, the four pairs of lanes in the device 1 (100) are mapped with the pairs of lanes of a device 4-1 (132), a device 4-2 (134), a device 4-3 (136) and a device 4-4 (138), respectively.

Figure 1D:
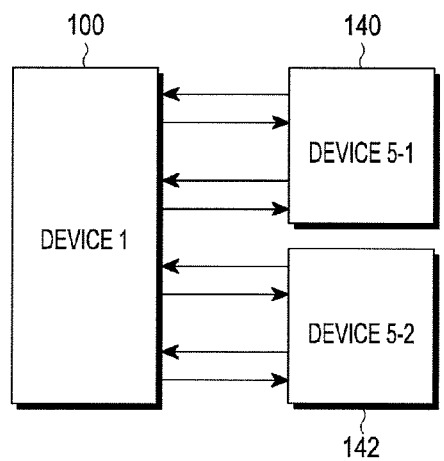
FIG. 1d illustrates an example of operating lanes of a device 1 (100) that is connected with two devices.

FIG. 1d illustrates an example of operating the lanes of the device 1 (100) that is connected to two devices.

Referring to FIG. 1d, the four pairs of lanes in the device 1 (100) are mapped with the pairs of lanes in a device 5-1 (140) and a device 5-2 (142), respectively.

As shown in FIGS. 1a to 1d, in case of increasing the numbers of devices that are connected with the lanes of a single device, a data transmission rate in each lane may be decreased, whereas the total amount of transmission data of the device may increase. At this time, the increase in the data transmission rate may be considerably limited.

Therefore, hereinafter, the present invention provides a method for effectively operating the lanes connected with a plurality of devices. More specifically, the present invention defines a master device that controls the transmission and reception of data of other devices except for the same among the plurality of devices. Herein, one or more master devices may be provided in the embodiment of the present invention. In addition, the master device makes a control of initialization and connection of the lanes of other devices. In addition, the other devices operated according to instructions and controls of the master device may be defined as slave devices. In other words, the lanes of the slave devices may be initialized and controlled by the master device.

The First Embodiment

Hereinafter, the first embodiment suggests the operation of a master device and the operation of a slave device according thereto in the case where a wireless communication system includes a single master device.

Figure 2:
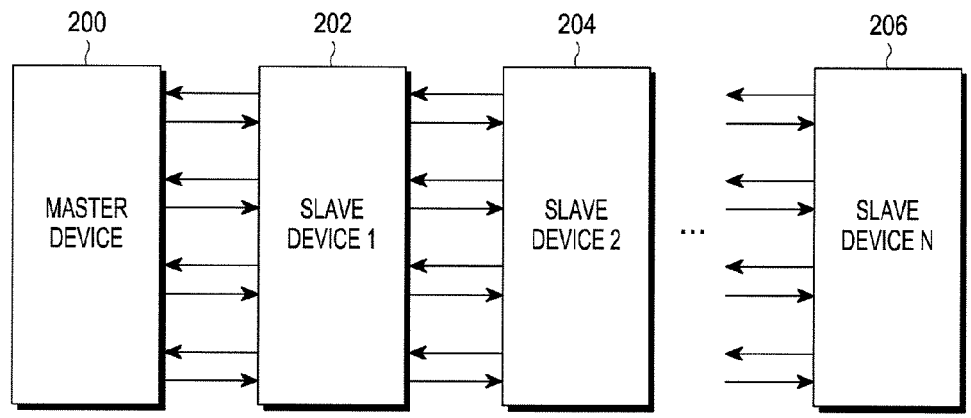
FIG. 2 is a configuration diagram of a wireless communication system comprised of a single master device according to the first embodiment of the present invention.

FIG. 2 is a configuration diagram of a wireless communication system comprised of a single master device according to the first embodiment of the present invention.

Referring to FIG. 2, a plurality of slaves, i.e., the first slave device 204, the second slave device 206 to the Nth slave device 208 are connected in series with each other, based on a master device 200.

Figure 3A:
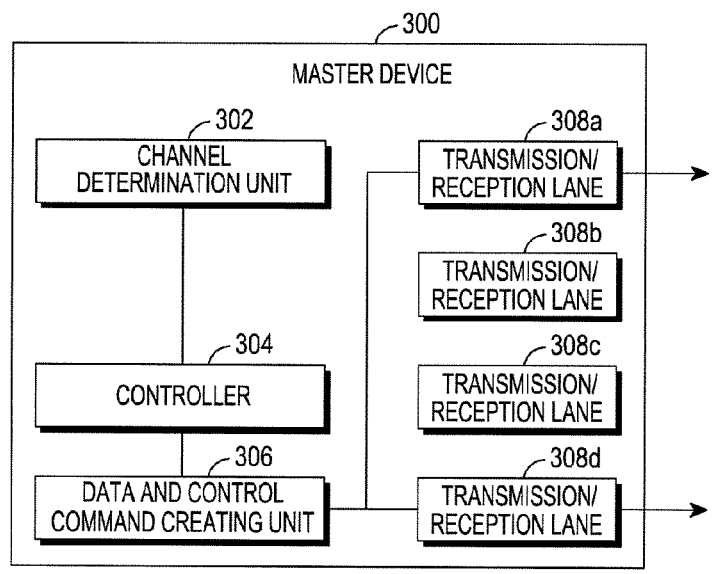
FIG. 3a is a configuration diagram of a master device according to the first embodiment of the present invention.

FIG. 3a is a configuration diagram of the master device according to the first embodiment of the present invention.

Referring to FIG. 31, the master device 300 may include a channel determination unit 302, a controller 304, and a data and control command creating unit 306. In addition, the master device 300 may further include transmission/reception lanes 308a to 308d for transmitting and receiving data to and from the slave devices that are connected with the master device 200 in series. Each of the transmission/reception lanes 308a to 308d is comprised of a pair of a transmission lane for receiving data through a lane of another slave device that is connected thereto, and a reception lane for transmitting data to a lane of another slave device. If the master device 300 is provided at the center of the serial connection structure, i.e., between the slave devices, the master device 300 may include more transmission/reception lanes to be connected with the lanes of the slave devices at both sides, or some of the transmission/reception lanes 308a to 308d may be connected with the lanes of the slave devices at both sides. Here, for example, the description is made of the case of four transmission/reception lanes. In addition, although the elements of the master device 300 are illustrated separately, according to operations according to the embodiment of the present invention, for convenience of explanation, they may be configured as one unit, or may be divided into a plurality of units.

The channel determination unit 302 may determine a lane for transmitting broadcast information to the slave devices connected in series thereto, and lanes to be used for the slave devices, from among the transmission/reception lanes 308a to 308d. The broadcast information may include a bandwidth available for the master device and channel information. The channel determination unit 302 may control the power of lanes of a previous device and a subsequent device, which are connected in series thereto, using the channel information. For example, with regard to the lanes that have no lane identification information included in the channel information, the channel determination unit 302 may convert the lanes into a link down state in which the lanes still remain on for management without transmitting and receiving data. In addition, with regard to the lanes that have lane identification information included in the information on channels, the channel determination unit 302 may connect the corresponding lanes to lanes of a previous device or a subsequent device.

The controller 304 controls the data and control command creating unit 306 to create lane identification information (hereinafter, referred to as "channel information") assigned to each slave device, and control information to instruct a corresponding slave device to read/write data. In addition, in creating the control information according to an instruction of the controller 304, the data and control command creating unit 306 may include an identifier of a destination slave in the control information.

Figure 3B:
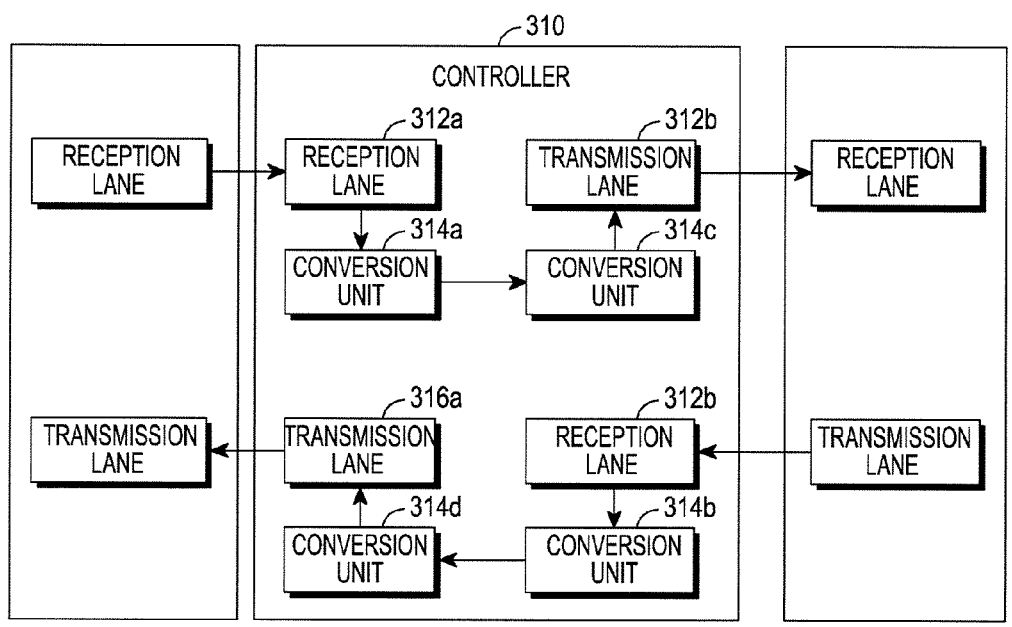
FIG. 3b is a configuration diagram of a slave device according to the first embodiment of the present invention.

FIG. 3b is a configuration diagram of a slave device according to the first embodiment of the present invention.

Referring to FIG. 3b, the slave device 310 may include a controller 312, and transmission/reception lanes that are connected with the lanes of other devices in the serial structure set forth above. Here, for example, the embodiment discloses a pair of lanes, i.e., one lane to be connected with the lane of another device that is previously connected (hereinafter, referred to as a "previous device"), and the other lane to be connected with the lane of another device that is subsequently connected (hereinafter, referred to as a "subsequent device"), based on the slave device 310. However, the slave device 310 may configure the lanes, which are to be connected with the previous device and the subsequent device, to be arranged in one direction, such that some of the lanes are connected with the lanes of the previous device and the others thereof are connected with the lanes of the subsequent device. It is obvious that the configuration of the slave device may be variously modified or altered according to embodiments of the present invention.

First, the reception lane 312a receives data input through the transmission lane provided in the previous device. Then, the conversion unit 314a may transform the data received by the reception lane 312a into a format suitable for use of the slave device 310, for example, by performing analog-digital conversion, to be thereby stored, and may transfer the data that has not been transformed to the conversion unit 314c. Then, the conversion unit 314c may perform synchronization of the non-transformed data in order to be transmitted through the transmission lane 316b, and may transfer the same to the transmission lane 316b. Then, the transmission lane 316b may output the data to the reception lane of another device, although not shown in the drawing, which is connected therewith.

Likewise, the reception lane 312b, the conversion unit 314b, the transmission lane 316a, and the conversion unit 314d may process the data received through the subsequent device in the same manner as the operation of the reception lane 312a, the conversion unit 314a, the transmission lane 316b, and the conversion unit 314c with respect to the previous device. Therefore, the detailed description thereof will be omitted here.

Meanwhile, the controller 312 may identify whether or not the control information received through the reception lane 312a includes its own identifier. As a result of the identification, if the control information includes its own identifier, the controller may perform an operation corresponding to the control information. In addition, if the identifier indicates another device, the controller 310 may control the transmission lane 316b to output the data to the subsequent device connected therewith.

Figure 4A:
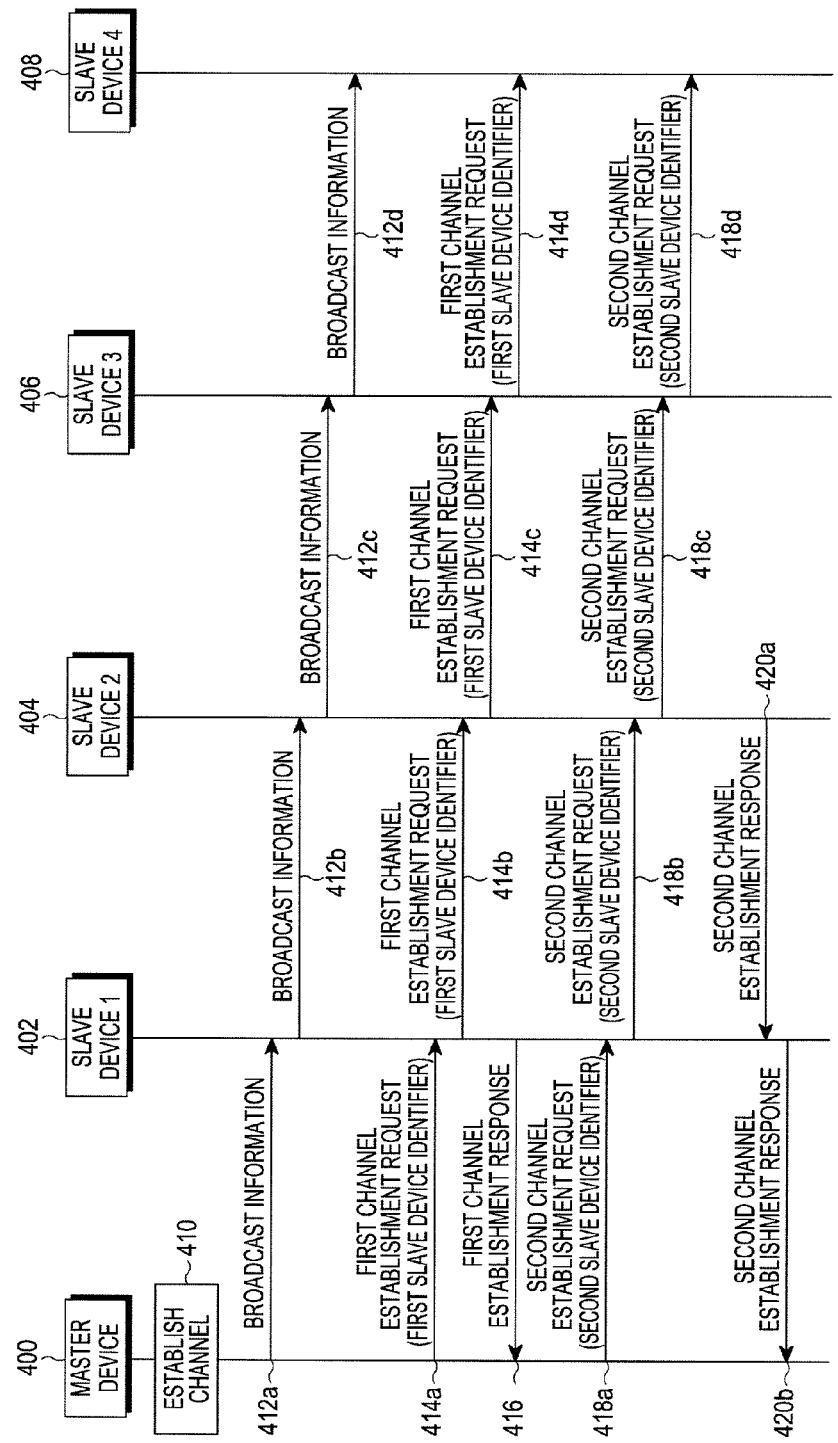
FIG. 4a is a flowchart of an operation in which a master device establishes channels for slave devices according to the first embodiment of the present invention.

FIG. 4a is a flowchart of an operation in which a master device establishes channels for slave devices according to the first embodiment of the present invention. Here, for example, the master device 400, and four slave devices connected therewith are disclosed.

Referring to FIG. 4a, in operation 410, the master device 400 may create broadcast information including a bandwidth available for the master device 400 and channel information. Here, the broadcast information may be configured through the same channel configured for the master device and the slave devices. It is assumed that a specific pair of lanes has been configured for the broadcast information among all pairs of lanes provided in the master device 1 (400) when the wireless communication system is built. At this time, the channel information corresponds to identification information on all lanes of the master device 400. In operation 412a, the master device 400 may transfer the broadcast information to the slave device 1 (402) that is connected in series thereto. Then, in operation 412b, the slave device 1 (402) may transfer the broadcast information to the slave device 2 (404) that is connected in series thereto. In operation 412c, the slave device 2 (404) may transfer the broadcast information to the slave device 3 (406) that is connected in series thereto. In addition, in operation 412d, the slave device 3 (406) may transfer the broadcast information to the slave device 4 (408) that is connected in series thereto. At this time, the slave devices may obtain a bandwidth available for the master device and channel information from the broadcast information through operations 412b to 412d.

Afterwards, the master device 400 may determine at least one pair of lanes to be connected to the first slave device 402 from among the available lanes, and may create information on the determined pair of lanes as the first channel information. Then, in operation 414a, the master device 400 may transmit a request for establishing the first channel to the slave device 1 (402). At this time, when transmitting the first channel establishment request, the master device 400 may start a timer that is to operate for a predetermined amount of time to count a waiting time for the reception of a response to the first channel establishment request. In addition, if the first channel establishment response is received before the timer expires, the master device recognizes that the first channel has been established with the slave device 1 (402). If the first channel establishment response is not received until the timer expires, the master device 400 may restart the timer as many times as a predetermined number "n" to wait for the reception of the first channel establishment response. At this time, whenever the number of times an operation of the timer increases, the master device may increase the operation time of the timer as much as a predetermined value. For example, the operation time of the timer for the second time may be configured to be double the operation time of the timer for the first time. The total number of times an operation of the timer and the operation time thereof may be preliminarily configured when building the system.

In addition, when the number of times an operation of the timer reaches the predetermined number "n", the master device may recognize that the slave device 1 (402) does not operate normally. The operation of the master device that has recognized the abnormal operation of the slave device will be described in the third embodiment of the present invention below.

The first channel establishment request includes the first channel information and an identifier of the slave device 1 (402). Then, in operation 414b, the slave device 1 (402) may transfer the first channel establishment request to the slave device 2 (404) that is connected in series therewith. In operation 414c, the slave device 2 (404) may transfer the first channel establishment request to the slave device 3 (406) that is connected in series therewith. In addition, in operation 414d, the slave device 3 (406) may transfer the first channel establishment request to the slave device 4 (408) that is connected in series therewith. At this time, in operations 414b to 414d, the slave devices that have recognized that the identifier of the slave device 1 (402) included in the first channel establishment request does not match their own identifiers may play the role of just forwarding the first channel establishment request to the subsequent devices that are connected therewith.

On the contrary, in operation 416, the slave device 1 (402) recognizes that the identifier obtained from the first channel establishment request matches its own identifier, and connects its own pair of lanes to at least one pair of lanes corresponding to the first channel information to thereby establish the first channel. In addition, the slave device 1 (402) may transfer the first channel establishment response stating that the first channel has been established to the master device 400.

Likewise, the master device 400 may determine at least one pair of lanes to be connected with the second slave device 402 from among the available lanes except for the lanes that have been used for the establishment of the first channel, and may create information on the determined pair of lanes as the second channel information. In addition, in operation 418a, the master device 400 may transfer the second channel establishment request to the slave device 1 (402). Likewise, the master device 400 may start the timer that is to operate for a predetermined amount of time to count a waiting time for the reception of a response to the second channel establishment request. In addition, if the second channel establishment response is received before the timer expires, the master device recognizes that the second channel has been established with the slave device 2 (404). If the second channel establishment response is not received until the timer expires, the master device 400 may restart the timer as many times as a predetermined number "n" to wait for the reception of the second channel establishment response. At this time, whenever the number of times an operation of the timer increases, the master device may increase the operation time of the timer. For example, the operation time of the timer for the second time may be configured to be double the operation time of the timer for the first time. The total number of times an operation of the timer and the operation time thereof may be preliminarily configured when building the system.

In addition, when the number of times an operation of the timer reaches the predetermined number "n", the master device 400 may recognize that the slave device 2 (404) does not operate normally. The second channel establishment request includes the second channel information and an identifier of the slave device 2 (404). Then, in operation 418b, the slave device 1 (402) may transfer the second channel establishment request to the slave device 2 (404) that is connected in series therewith. In operation 418c, the slave device 2 (404) may transfer the second channel establishment request to the slave device 3 (406) that is connected in series therewith. In addition, in operation 418d, the slave device 3 (406) may transfer the second channel establishment request to the slave device 4 (408) that is connected in series therewith. At this time, in operations 418b to 418d, the slave device 3 (406) and the slave device 4 (408) recognize that the identifier of the slave device 2 (402) included in the second channel establishment request does not match their own identifiers, and may play the role of just forwarding the second channel establishment request to the subsequent devices that are connected therewith.

On the contrary, in operation 420a, the slave device 2 (402) recognizes that the identifier obtained from the second channel establishment request matches its own identifier, and connects its own pair of lanes to at least one pair of lanes corresponding to the second channel information to thereby establish the second channel. In addition, the slave device 2 (402) may transfer the second channel establishment response stating that the second channel has been established to the slave device 1 (402) connected in series therewith. Then, in operation 420b the slave device 1 (402) may transfer the second channel establishment response to the master device 400.

Likewise, although it is not shown in FIG. 4a, the master device 400 may determine at least one pair of lanes to be connected with the slave device 3 (406) and the slave device 4 (408), respectively, and may create channel information corresponding to the same to be thereby transmitted through the connected slave devices.

Afterwards, when the channels for the respective master device 400 and the slave device 1 (402) to the slave device 4 (408) are established, the master device 400 and the slave device 1 (402) to the slave device 4 (408) may transmit and receive data using the established channels.

Figure 4B:
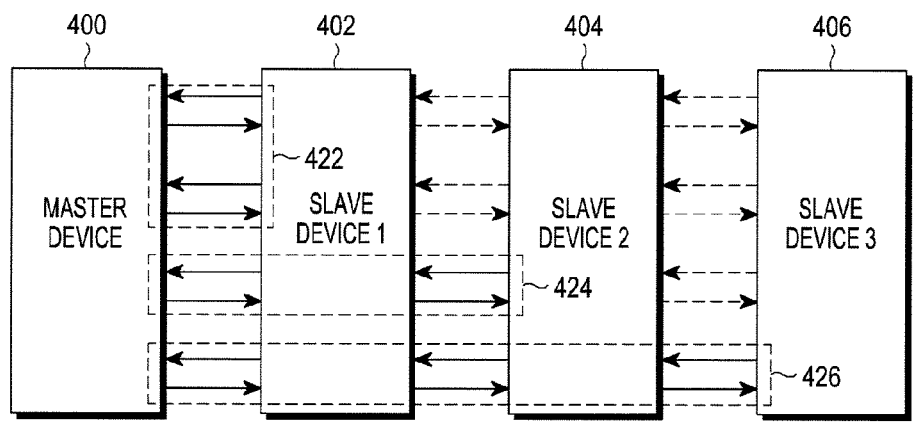
FIGS. 4b to 4e illustrate examples of lanes that a master device assigns to slave devices that are connected in series thereto according to an embodiment of the present invention.

FIGS. 4b to 4e illustrate examples of lanes that the master device assigns to slave devices that are connected in series thereto according to an embodiment of the present invention. Here, the present embodiment, for example, discloses the master device 400 that has four pairs of lanes that are assigned to three slave devices 402 to 406, which are connected with the master device 400 in series. However, the number of lanes provided in the master device and the number of slave devices connected in series thereto may not be limited thereto, and may be different according to a system operating environment. Referring to FIG. 4b, for example, the master device 400 connects the first and the second pairs of lanes 422 among four pairs of lanes to the pairs of lanes of the slave device 1 (402). In this case, the first channel information in FIG. 4a corresponds to the identification information for the first and the second pairs of lanes 422. In addition, the third pair of lanes 424 of the master device 400 is connected with a pair of lanes of the slave device 2 (404). In this case, the second channel information in FIG. 4a corresponds to the identification information for the third pair of lanes 424. Finally, the fourth pair of lanes 426 of the master device 400 is connected with a pair of lanes of the slave device 3 (406). In this case, the first and the second pairs of lanes connected between the slave device 1 (402) and the slave device 2 (404) are not used for transmitting and receiving data in order to reduce power consumption, so the slave device 1 (402) and the slave device 2 (404) may convert the lanes corresponding to the first and the second pairs of lanes into the link down state. Likewise, the first to the third pairs of lanes between the slave device 2 (404) and the slave device 3 (406) may be converted into the link down state by the slave device 2 (404) and the slave device 3 (404).

Figure 4C:
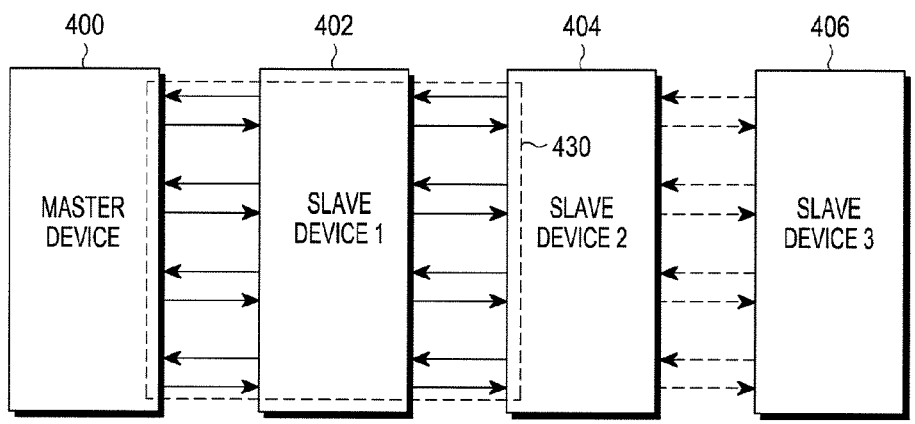

Referring to FIG. 4c, for example, the master device 400 is connected with the slave device 1 (402) and the slave device 2 (404) through four lanes 430. In addition, the master device 400 is not connected with the slave device 3 (406) through the lanes. Then, the slave device 2 (404) and the slave device 3 (406) may convert the lanes to be connected between them into the down link state.

Figure 4D:
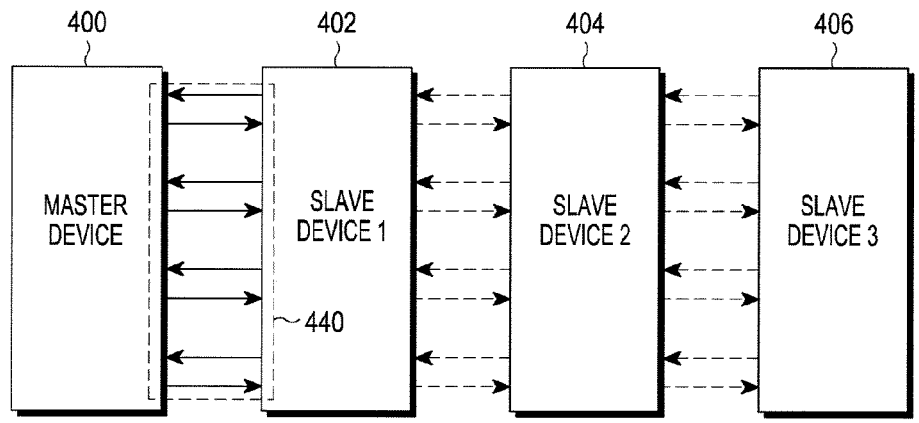

Referring to FIG. 4d, for example, the master device 400 connects four lanes 440 to the slave device 1 (402), and no lane is connected with the other slave devices. Accordingly, the slave device 1 (402) and the slave device 2 (404) may convert the lanes to be connected between them into the down link state, and the slave device 2 (404) and the slave device 3 (406) may convert the lanes to be connected between them into the down link state as well.

Figure 4E:
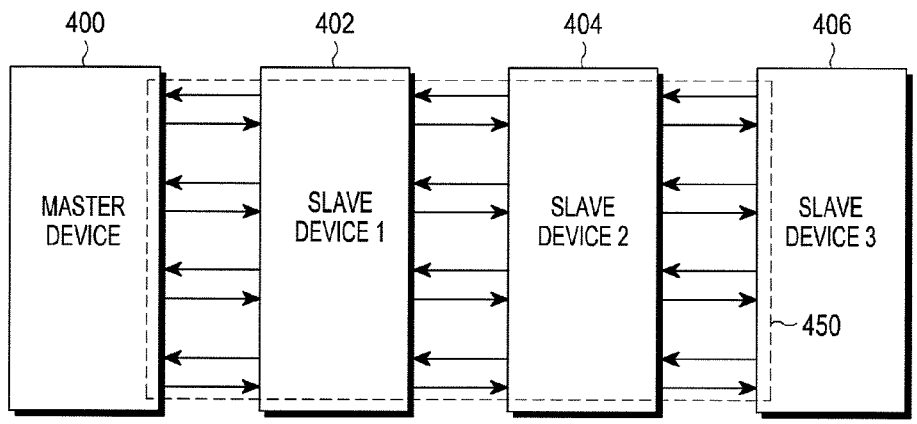

Referring to FIG. 4e, for example, the master device 400 connects all of four lanes 450 to the slave device 1 (402), the slave device 2 (404), and the slave device 3 (406).

As shown in FIGS. 4b to 4e, the master device 400, according to the first embodiment of the present invention, may variously configure the number of pairs of lanes to be connected with the slave devices according to a communication status and a desired bandwidth. More specifically, the master device 400 may divide and assign its own pairs of lanes to each slave device or some slave devices as shown in FIGS. 4c and 4d. However, since a plurality of devices including the master device are connected with each other in series in the wireless communication system of the present invention, in order to assign the lanes to a specific slave device, the lanes of the previous devices between the specific device and the master device should be connected. Here, for convenience of explanation, the lanes in the link down state, in which electric power is applied only without transmission/reception of data, are illustrated by dotted lines.

The Second Embodiment

Hereinafter, the second embodiment suggests the operation of the master devices and the operation of the slave devices, according thereto, in the case of two or more master devices adopted in the wireless communication system. Hereinafter, although two master devices are disclosed in the present specification, the present invention can be applied to the case of more than two master devices as well, wherein the corresponding master devices may operate in the similar manner to two master devices above.

Figure 5A:
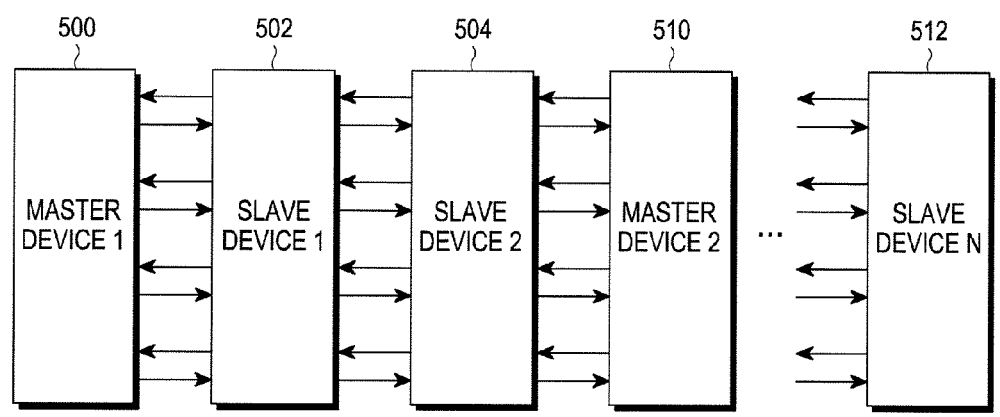
FIG. 5a is a configuration diagram of a wireless communication system comprised of two master devices according to the second embodiment of the present invention.

FIG. 5a is a configuration diagram of a wireless communication system comprised of two master devices according to the second embodiment of the present invention.

Referring to FIG. 5a, two slave devices, i.e., the slave device 1 (502) and the slave device 2 (504) are connected in series between the master device 1 (500) and the master device 2 (510). In addition, a plurality of slave devices follows the master device 2 (510) to be connected thereto.

Meanwhile, a detailed configuration of the master device of the present invention is similar to that of the first embodiment of the present invention, so it will be described with reference to FIG. 3a.

Referring to FIG. 3a, the controller 304 of the master device 300 according to the second embodiment of the present invention may identify whether or not another master device exists among the devices connected therewith. If another master device is identified to exist, the controller 304 may make a control to transfer the currently available bandwidth and channel information to another master device through the transmission/reception lanes 308a to 308d via the slave devices connected therewith. In addition, when the channel information of another master device is received through the transmission/reception lanes 308a to 308d, the controller 304 transfers the same to the channel controller 302. Then, the channel controller 302 may assign the channels except for the channels corresponding to the channel information of another master device, among available channels, as the channels to transfer its own control information and data to the corresponding slave devices. In addition, the control command creating unit 306 may transfer the channel information of the master device through the assigned channels.

Meanwhile, the configuration of the slave device according to the second embodiment of the present invention is similar to that of FIG. 3b, so the detailed description thereof will be omitted here.

Figure 5B:
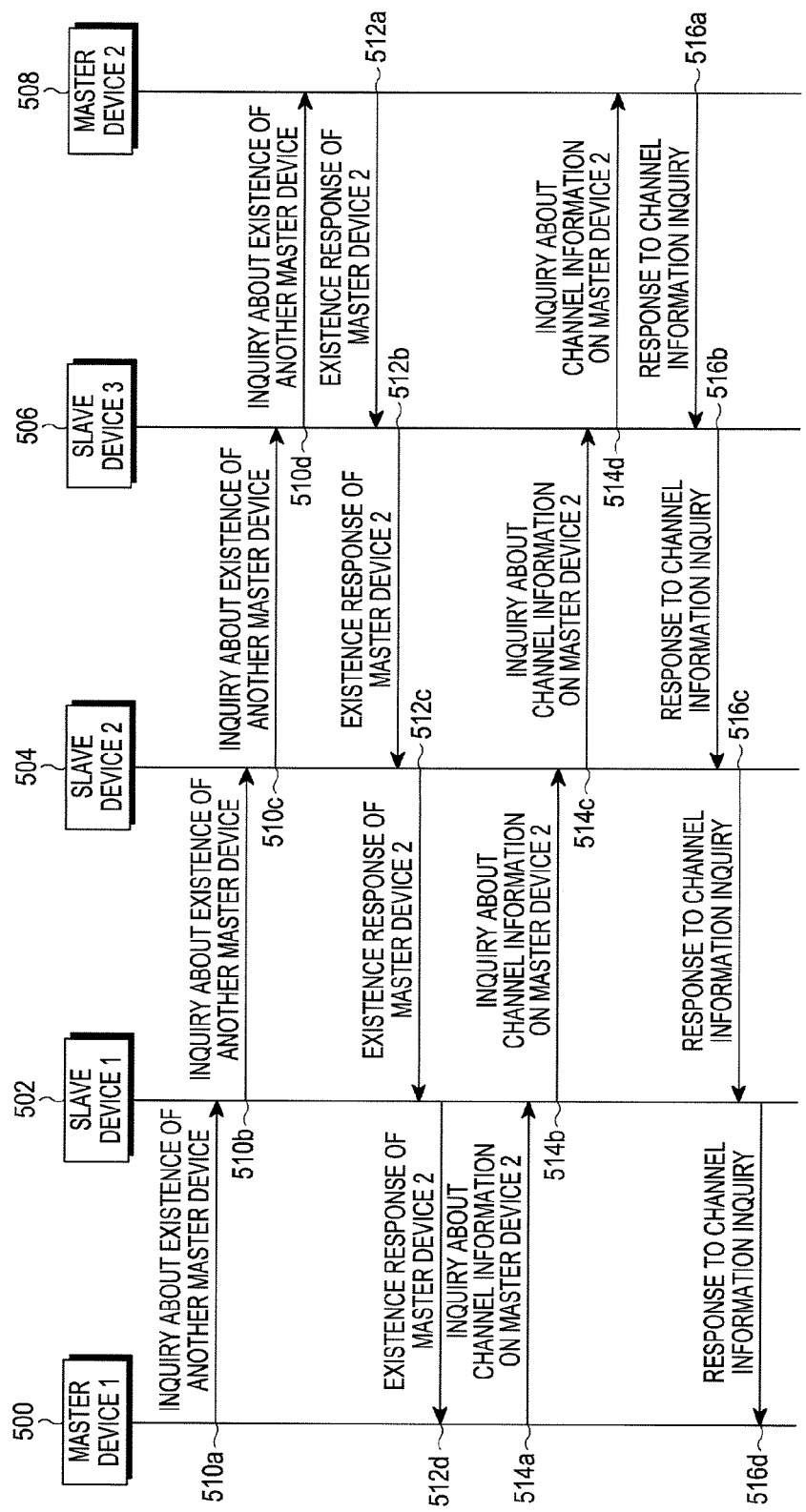
FIG. 5b is a flowchart of an operation in which a master device identifies whether or not there is another master device among devices that are connected in series thereto, according to the second embodiment of the present invention.

FIG. 5b is a flowchart of an operation in which the master device identifies whether or not another master device exists among the devices that are connected in series thereto, according to the second embodiment of the present invention. Here, for example, it is assumed that the master device 1 (500) is connected with three slave devices 502 to 506, and another master device 2 (508) in series.

Referring to FIG. 5b, in operation 510a, the master device 1 (500) may transfer an inquiry about whether or not another master device, except for the master device 1 (500), exists among the devices connected in series therewith to the slave device 1 (502). At this time, the master device 1 (500) may start a timer that is to operate for a predetermined amount of time to count a waiting time for the reception of a response to the inquiry. In addition, if the response is received before the timer expires, the master device recognizes that another master device exists. If the response is not received until the timer expires, the master device 1 (500) may restart the timer as many times as a predetermined number "n" to wait for the reception of the response. At this time, whenever the number of times an operation of the timer increases, the master device may increase the operation time of the timer. For example, the operation time of the timer for the second time may be configured to be double the operation time of the timer for the first time. The total number of times an operation of the timer and the operation time thereof may be preliminarily configured when building the system.

In addition, when the number of times an operation of the timer reaches the predetermined number "n", the master device may recognize that another master device does not exist, and may operate in the same manner as the master device of the first embodiment.

Then, in operations 510b to 510d, the slave device 1 (502) may transfer the inquiry to the master device 2 (508) through the slave device 2 (504) and the slave device 3 (506).

In operation 512a, the master device 2 (508) may transfer an existence response of the master device 2, which states that the master device 2 (508) exists, to the slave device 3 (506) in response to the inquiry. Then, in operations 512b to 512d, the slave device 3 (506) may transfer the existence response of the master device 2 to the master device 1 (500) through the slave device 2 (504) and the slave device 1 (502).

The master device 1 (500) that has received the existence response of the master device 2 recognizes that the master device 2 (508) exists, and may transfer a channel information inquiry for the master device 2 (508) to the slave device 1 (502) in operation 514a. Then, in operations 514b to 514d, the slave device 1 (502) may transfer the channel information inquiry for the master device 2 (508) to the master device 2 (508) through the slave device 2 (504) and the slave device 3 (506).

Then, the master device 2 (508), which has received the channel information inquiry, may create an available bandwidth and channel information in response to the channel information inquiry. Here, the channel information corresponds to identification information on all lanes provided in the master device 2 (508). In addition, in operation 516a, the master device 2 (508) may transfer the response to the slave device 3 (506). Then, in operations 516b to 526d, the slave device 3 (506) may forward the response to the master device 1 (500) through the slave device 2 (504) and the slave device 1 (502).

Figure 5C:
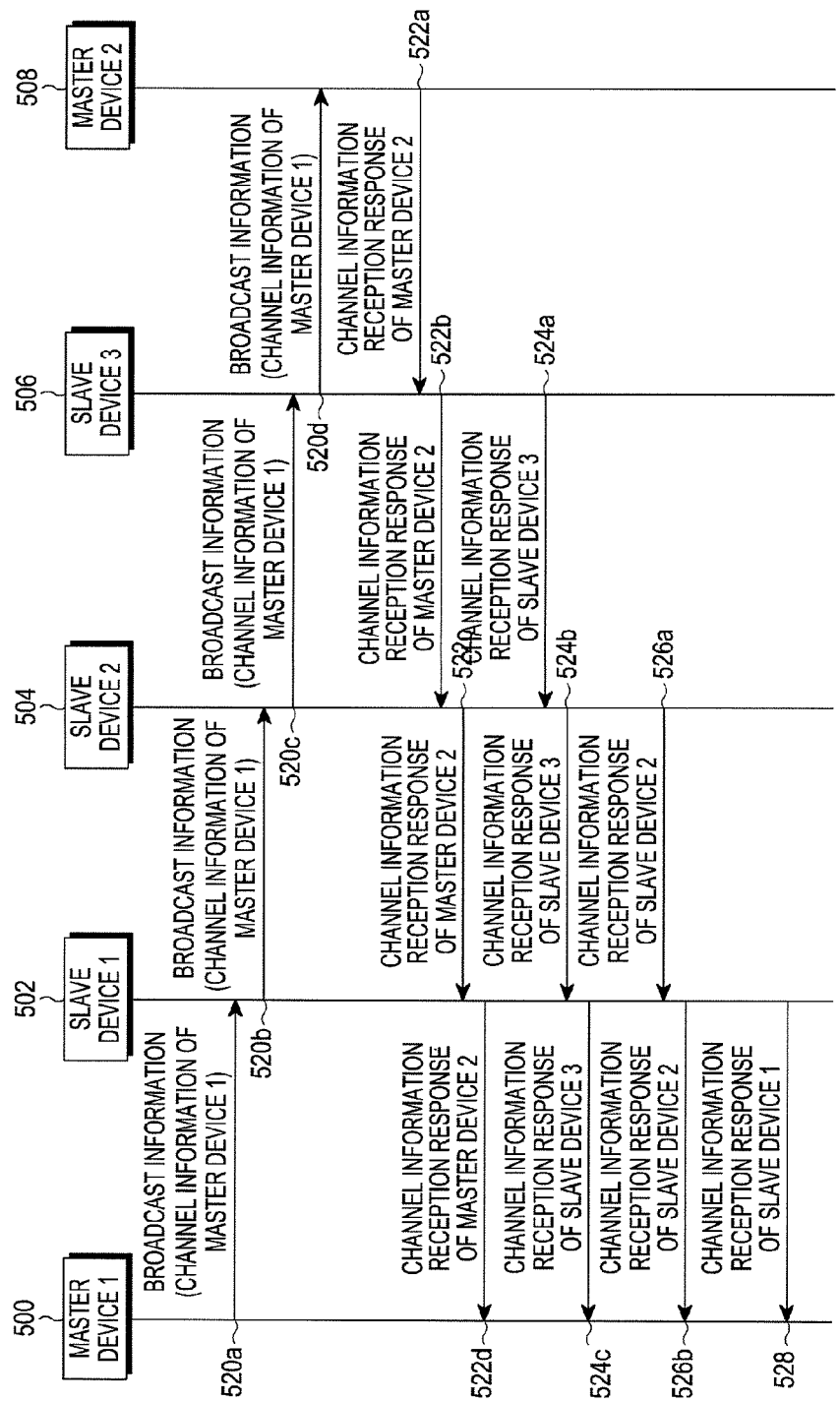
FIG. 5c is a flowchart of an operation in which the master device 1 transfers its own channel information according to the second embodiment of the present invention.

FIG. 5c is a flowchart of an operation in which the master device 1 transfers its own channel information according to the second embodiment of the present invention. Here, for example, it is assumed that the master device 1 (500) is connected in the same way as that of FIG. 5b.

Referring to FIG. 5c, in operation 520a, the master device 1 (500) may create channel information on the master device 1 (500) in consideration of the available bandwidth and channel information of the master device 2 (508), which are obtained through the operation of FIG. 5b. Here, the channel information of the master device 1 (500) may be transferred through the same channel established for the master device 1 (500), the slave devices, and the master device 2 (508). It is assumed that the same channel has been preliminarily established through a certain pair of lanes among the entire pairs of lanes provided in the master device 1 (500) when configuring the wireless communication system. At this time, the channel information corresponds to the identification information on the lanes to be actually connected with the slave device 1 (502) to the slave device 3 (506) among the entire lanes of the master device 500. For example, the channel information of each corresponding slave device includes lane identification information, which is assigned to the slave device, and an identifier of the slave device. In operation 520a, the master device 1 (500) may transfer the channel information of the master device 1 (500) to the slave device 1 (502) connected in series therewith. At this time, the master device 1 (500) may start a timer for each corresponding device, which is to operate for a predetermined amount of time in order to count a waiting time for the reception of a response to the channel information of the master device 1 (500) from the slave device 1 (502), the slave device 2 (504), the slave device 3 (506), and the master device 2 (508), which are connected in series therewith. For example, the operation time of each device may be configured to be proportional to the number of devices that are connected between the master device and the each corresponding device. Likewise, if the corresponding response is not received until the timer for each device expires, the timer is restarted as many times as a predetermined number, and whenever the timer is restarted, the operation time increases as much as a predetermined value. For example, the operation time of the timer for the second time may be configured to be double the operation time of the timer for the first time. The total number of times an operation of the timer and the operation time thereof may be preliminarily configured when building the system.

Then, in operation 520b, the slave device 1 (502) may recognize that the lane identification information mapped with the identifier of the slave device 1 (502) is the channel information assigned to the slave device 1 (502), based on the channel information of the master device 1 (500), and may transfer the channel information of the master device 1 (500) to the slave device 2 (504) connected in series therewith. In operation 520c, the slave device 2 (504) may recognize that the lane identification information mapped with an identifier of the slave device 2 (504) is the channel information assigned to the slave device 2 (504), based on the channel information of the master device 1 (500), and may transfer the channel information of the master device 1 (500) to the slave device 3 (506) connected in series therewith. In addition, in operation 520d, the slave device 3 (506) may recognize that the lane identification information mapped with an identifier of the slave device 3 (506) is the channel information assigned to the slave device 3 (506), based on the channel information of the master device 1 (500), as well. Then, the slave device 3 (506) may transfer the channel information of the master device 1 (500) to the master device 2 (508) connected in series therewith.

Afterwards, in operation 522a, the master device 2 (508) may create a channel information reception response of the master device 2 (508) in response to the channel information of the master device 1 (500), and may transfer the same to the slave device 3 (506). Likewise, in operations 522b to 522d, the slave device 3 (506) may transfer the channel information reception response of the master device 2 (508) to the master device 1 (500) through the slave device 2 (504) and the slave device 1 (502), which are connected therewith.

In operation 524a, the slave device 3 (506) may create a channel information reception response of the slave device 3 (506) in response to the channel information of the master device 1 (500), and may transfer the same to the slave device 2 (504). Likewise, in operations 524b and 524c, the slave device 2 (504) may transfer the channel information reception response of the slave device 3 (506) to the master device 1 (500) through the slave device 1 (502).

In addition, in operation 526a, the slave device 2 (504) may create a channel information reception response of the slave device 2 (504) in response to the channel information of the master device 1 (500), and may transfer the same to the slave device 1 (502). Then, in operation 526b, the slave device 1 (502) may transfer the channel information reception response of the slave device 2 (504) to the master device 1 (500).

Finally, in operation 528, the slave device 1 (502) may create a channel information reception response of the slave device 1 (502) in response to the channel information of the master device 1 (500), and may transfer the same to the master device 1 (500) as well.

Meanwhile, for convenience of explanation, the channel information reception responses of the slave devices and the master device 2 (508) are illustrated to be transferred to the master device 1 (500) through the slave devices, which are connected with the same, in sequence in operations 522a to 528 of FIG. 5c. Alternatively, the channel information reception responses for the devices may be transferred to the master device 1 (500) in order of a connection close to the master device 1 (500), or may be transferred differently according to ability of each corresponding device, i.e., a time for recognizing its own channel information and creating the channel information reception response.

When the channel assignment to the slave devices by the master device 1 (500) is completed according to the procedure of FIG. 5c, as described above, the master device 1 (500) and the slave devices come to a state of transmitting and receiving data through the corresponding channel.

Figure 5D:
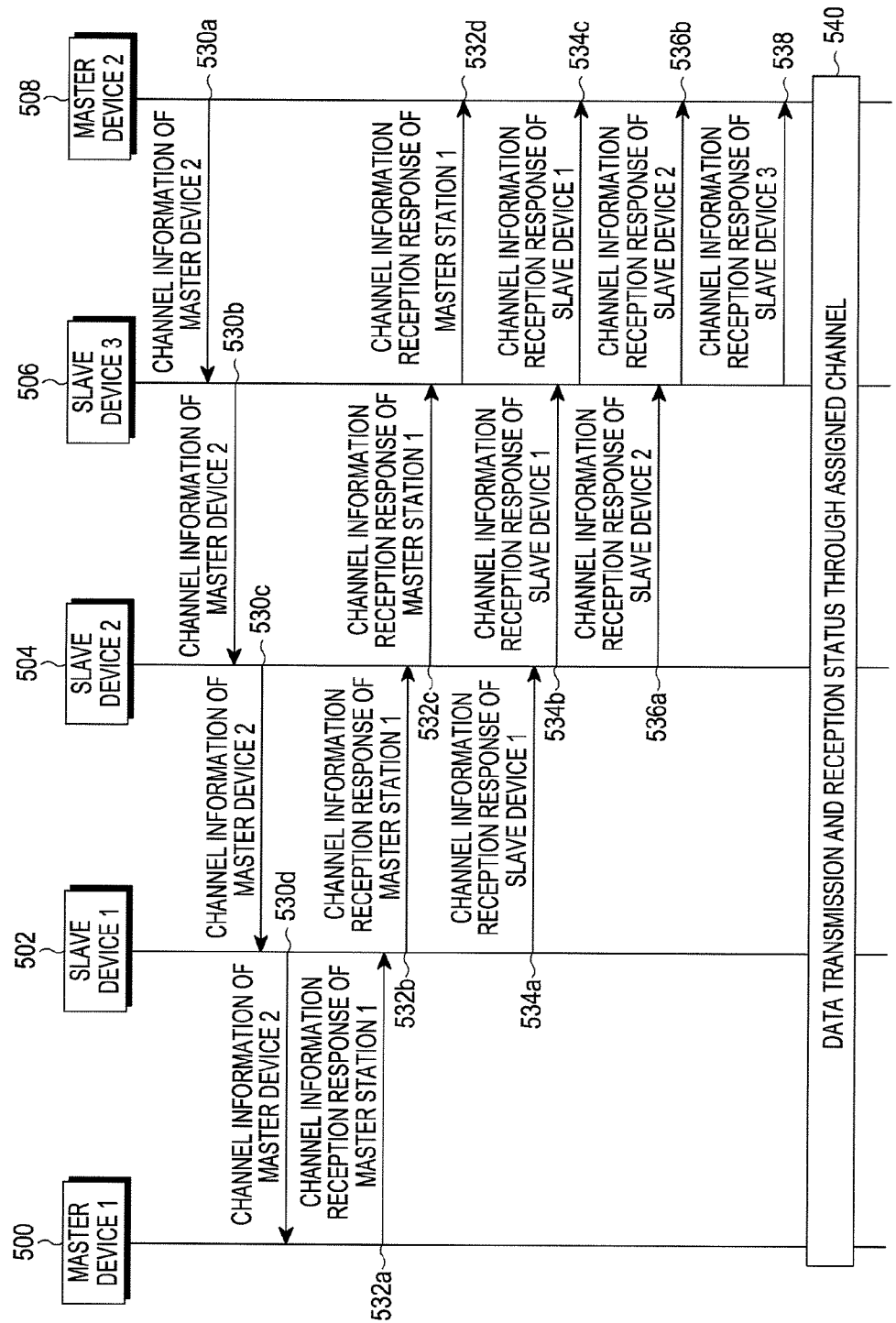
FIG. 5d is a flowchart of an operation in which the master device 2 transfers its own channel information according to the second embodiment of the present invention.

FIG. 5d is a flowchart of an operation in which the master device 2 transfers its own channel information according to the second embodiment of the present invention. Here, for example, it is assumed that the master device 1 (500) is connected in the same way as that of FIG. 5b.

Referring to FIG. 5d, the master device 2 (508) that has obtained the channel information of the master device 1 (500) through operations 520a to 502d of FIG. 5c may create channel information on the master device 2 (508) with respect to the channels that are not included in the channel information of the master device 1 (500) from among the available bandwidth and channel information. Here, the channel information of the master device 2 (508) may be transferred through the same channel preliminarily established when configuring the wireless communication system. The channel information corresponds to the identification information on the lanes to be actually connected with the slave device 1 (502) to the slave device 3 (506) among the lanes that are not used by the master device 1 (500) in the entire lanes provided in the master device 2 (508). For example, the channel information of each corresponding slave device includes lane identification information, which is assigned to the slave device, and an identifier of the slave device. In operation 530a, the master device 2 (508) may transfer the channel information of the master device 2 (508) to the slave device 3 (506) connected in series therewith. At this time, the master device 2 (508) may start a timer for each corresponding device, which is to operate for a predetermined amount of time in order to count a waiting time for the reception of a response to the channel information of the master device 2 (508) from the slave device 3 (506), the slave device 2 (504), the slave device 1 (502), and the master device 1 (500), which are connected in series therewith. For example, the operation time of each device may be configured to be proportional to the number of devices that are connected between the master device and the each corresponding device. Likewise, if the corresponding response is not received until the timer for each device expires, the timer is restarted as many times as a predetermined number, and whenever the timer is restarted, the operation time increases as much as a predetermined value. For example, the operation time of the timer for the second time may be configured to be double the operation time of the timer for the first time. The total number of times an operation of the timer and the operation time thereof may be preliminarily configured when building the system.

Then, in operation 530b, the slave device 3 (506) may recognize that the lane identification information mapped with an identifier of the slave device 3 (506) is the channel information assigned to the slave device 3 (506), based on the channel information of the master device 2 (508), and may transfer the channel information of the master device 2 (508) to the slave device 2 (504) connected in series therewith. In operation 530c, the slave device 2 (504) may recognize that the lane identification information mapped with an identifier of the slave device 2 (504) is the channel information assigned to the slave device 2 (504), based on the channel information of the master device 2 (508), and may transfer the channel information of the master device 2 (508) to the slave device 1 (502) connected in series therewith. In addition, in operation 530d, the slave device 1 (502) may recognize that the lane identification information mapped with an identifier of the slave device 1 (502) is the channel information assigned to the slave device 1 (502), based on the channel information of the master device 2 (508), as well. Then, the slave device 3 (506) may transfer the channel information of the master device 2 (508) to the master device 1 (500) connected in series therewith.

Afterwards, in operation 532a, the master device 1 (500) may create a channel information reception response of the master device 1 (500) in response to the channel information of the master device 2 (508), and may transfer the same to the slave device 1 (502). Likewise, in operations 532b to 532d, the slave device 1 (502) may transfer the channel information reception response of the master device 1 (500) to the master device 2 (508) through the slave device 2 (504) and the slave device 3 (506), which are connected in series therewith.

In operation 534a, the slave device 1 (502) may create a channel information reception response of the slave device 1 (502) in response to the channel information of the master device 2 (508), and may transfer the same to the slave device 2 (504). Likewise, in operations 534b and 534c, the slave device 2 (504) may transfer the channel information reception response of the slave device 1 (502) to the master device 2 (508) through the slave device 3 (506).

In addition, in operation 536a, the slave device 2 (504) may create a channel information reception response of the slave device 2 (504) in response to the channel information of the master device 1, and may transfer the same to the slave device 3 (506). Then, in operation 536b, the slave device 3 (506) may transfer the channel information reception response of the slave device 2 (504) to the master device 2 (508).

Finally, in operation 538, the slave device 3 (506) may create a channel information reception response of the slave device 3 (506) in response to the channel information of the master device 1, and may transfer the same to the master device 2 (508) as well.

Meanwhile, for convenience of explanation, the channel information reception responses of the slave devices and the master device 1 (500) are illustrated to be transferred to the master device 2 (508) through the slave devices, which are connected with the same, in sequence in operations 532a to 538 of FIG. 5d. Alternatively, the channel information reception responses for the devices may be transferred to the master device 2 (508) in order of a connection close to the master device 2 (508), or may be transferred differently according to ability of each corresponding device, i.e., a time for recognizing its own channel information and creating the channel information reception response.

Meanwhile, the channel information of the master device 1 (500) and the channel information of the master device 2 (508) in FIGS. 5c and 5d may include channel information assigned to each slave device, or may include channel information equally assigned to the entire slave devices.

Likewise, when the channel assignment to the slave devices by the master device 2 (508) is completed according to the procedure of FIG. 5d, as described above, the master device 2 (508) and the slave devices come to a state of transmitting and receiving data through the corresponding channel.

Figure 5E:
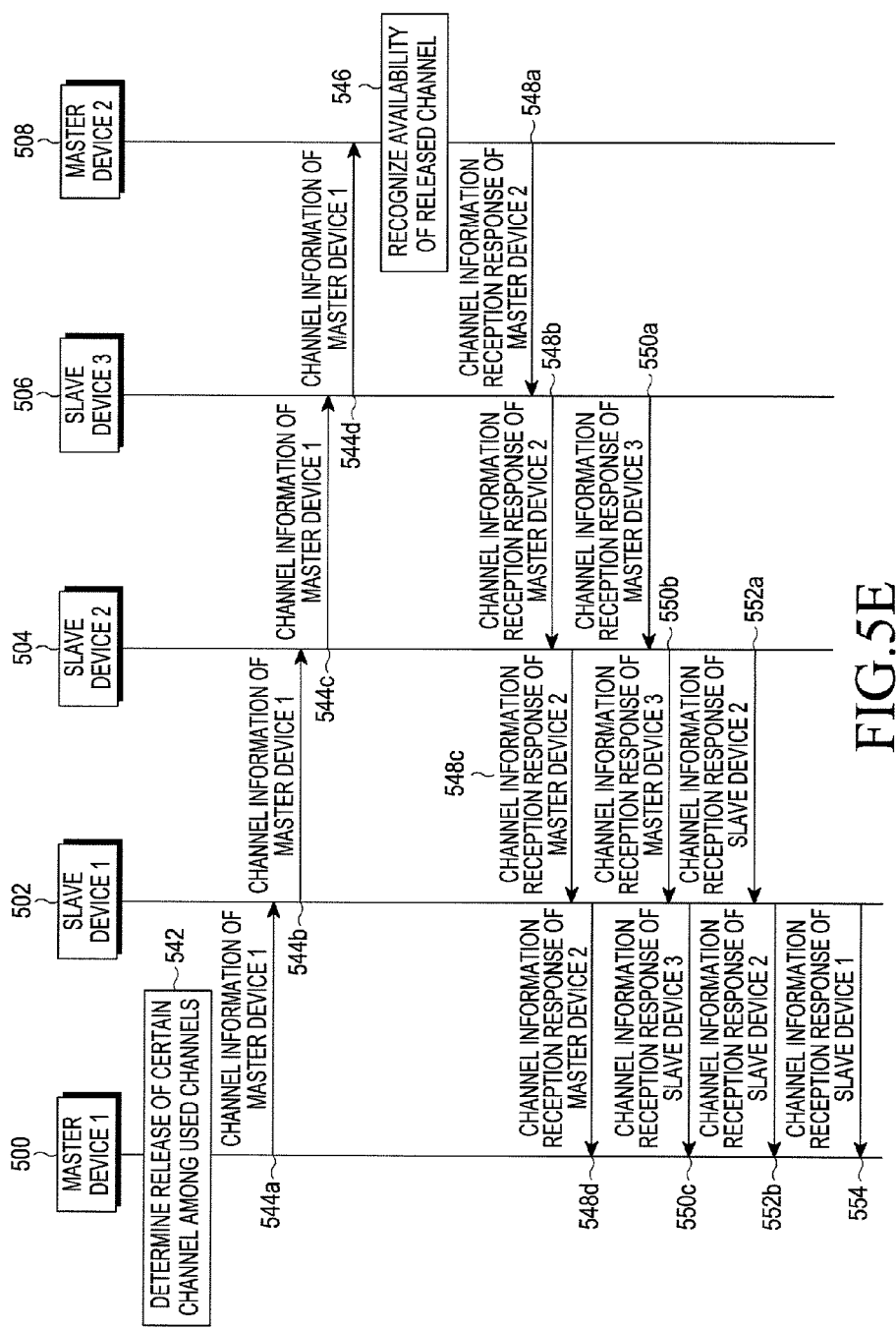
FIG. 5e is a flowchart of an operation in which a master device transfers released channel information to another master device according to the second embodiment of the present invention.

FIG. 5e is a flowchart of an operation in which the master device transfers channel information released from the master device to another master device according to the embodiment of the present invention. Here, for convenience of explanation, it is assumed that the channel used between the master device 1 (500) and the slave devices has been established through the operation of FIG. 5c.

Referring to FIG. 5e, in operation 542, the master device 1 (500) may determine a certain channel to be released among the channels assigned to the slave device 1 (502) to the slave device 3 (506) through the operation of FIG. 5c. For example, the description will be made of a release of the channel assigned to the slave device 2 (504). Then, in operation 544a, the master device 1 (500) may transfer the channel information of the master device 1 (500), which includes the released channel information, to the slave device 1 (502). The released channel information, for example, may include the identifier of the slave device 2 (504), and released lane identification information that is mapped with the same. Then, in operations 544b to 544d, the slave device 1 (502) may transfer the channel information of the master device 1 to the master device 2 (508) through the slave device 2 (504) and the slave device 3 (506). Here, the slave device 1 (502) and the slave device 3 (506) may recognize that the channel information of the master device 1 (500) does not include their own identifiers and thus the channel information of the master device 1 (500) has nothing to do with them. On the contrary, the slave device 2 (504) may identify its own identifier included in the channel information of the master device 1 (500) to thereby recognize that the channel established with the master device 1 (500) has been released.

Afterwards, in operation 546, the master device 2 (508) may identify that the channel of the slave device 2 (504) has been released through the channel information of the master device 1 (500). In this case, the master device 2 (508) may include the released channel information of the slave device 2 (504) in the channel information that can be assigned to the slave devices that are to communicate with the master device 2 (508). In addition, the released channel information of the slave device 2 (504) may be used when assigning the channels later on. Then, in operation 548a, the master device 2 (508) may create a channel information reception response of the master device 2 in response to the released channel information, and may transfer the same to the slave device 3 (506). Then, in operations 548b to 548d, the slave device 3 (506) may transfer the channel information reception response of the master device 2 to the master device 1 (500) through the slave device 2 (504) and the slave device 1 (502), respectively.

Likewise, in operation 550a, the slave device 3 (506) may create a channel information reception response of the slave device 3 in response to the released channel information, and may transfer the same to the slave device 2 (504). Then, in operations 550b and 550c, the slave device 2 (506) may transfer the channel information reception response of the slave device 3 to the master device 1 (500) through the slave device 1 (502).

In addition, in operation 552a, the slave device 2 (504) may create a channel information reception response of the slave device 2 in response to the released channel information, and may transfer the same to the slave device 1 (502). Then, in operation 552b, the slave device 1 (502) may transfer the channel information reception response of the slave device 2 to the master device 1 (500) as well. Finally, in operation 554, the slave device 1 (502) may create a channel information reception response of the slave device 1 in response to the released channel information, and may transfer the same to the master device 1 (500).

Figure 5F:
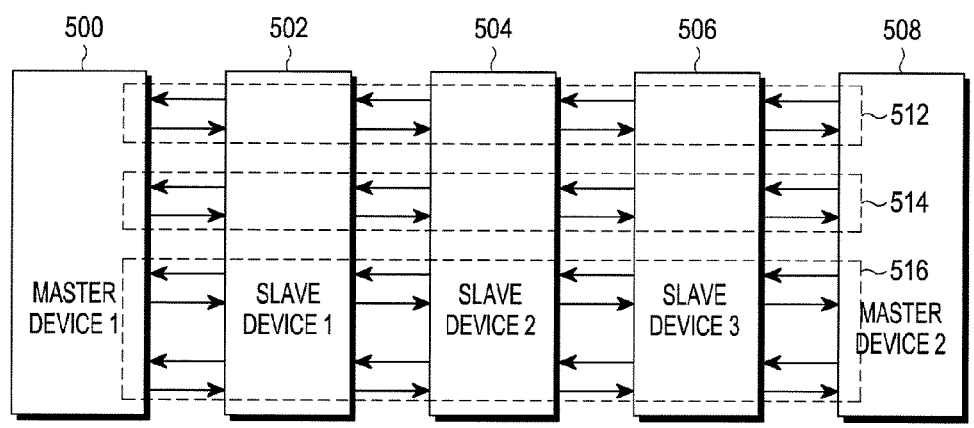
FIG. 5f illustrates an example of assigning lanes in the case of two master devices according to the second embodiment of the present invention.

FIG. 5f illustrates an example of assigning lanes in the case of two master devices according to the second embodiment of the present invention. Here, for example, it is assumed that three slave devices 502 to 506 are connected between the master device 1 (500) and the master device 2 (508) in series. In addition, the master device 1 (500) and the master device 2 (518) have four pairs of available lanes in total. However, the number of lanes provided in the master devices and the number of slave devices connected in series thereto may not be limited thereto, and may be different according to a system operating environment.

Referring to FIG. 5f, for example, the master device 1 (500) may assign the first pair of lanes 512 among four pairs of lanes as a channel for broadcasting the channel information of the master device 1 (500). In addition, the master device 1 (500) may transfer its own channel information or information on the channels that have been assigned to the slave devices to the slave device 1 (502), the slave device 2 (504), the slave device 3 (506), and the master device 2 (508) through the first pair of lanes 512. In addition, the master device 2 (508) may identify the channel information of the master device 1 (500) received through the first pair of lanes 512, and may assign the lanes corresponding to the channels that are not used by the master device 1 (500) among the available lanes as the channel for broadcasting the channel information of the master device 2 (508). For example, the second pair of lanes 514 among four pairs of lanes is assigned as the broadcast channel of the master device 2 (508). In addition, the master device 2 (508) may transfer the channel information of the master device 2 (508) to the slave device 3 (506), the slave device 2 (504), the slave device 1 (502), and the master device 1 (500) through the second pair of lanes 514.

In the case of two or more master devices in the wireless communication system according to the second embodiment of the present invention, if one master device obtains a master chip, the other master devices operate according to the instruction of the master device having the master chip. For example, if the master device 1 (500) obtains the master chip, the master device 1 (500) may transfer control messages to instruct the corresponding slave device to read and write data through the channel corresponding to the first pair of lanes 512. Likewise, if the master device 2 (508) obtains the master chip, the master device 2 (508) may transfer control messages to instruct the corresponding slave device to read and write data through the channel corresponding to the second pair of lanes 514. In addition, the corresponding slave device that has received the control message mapped with its own identifier through the master device 1 (500) or the master device 2 (508), which obtains the master chip, may transfer a result of the operation corresponding to the control message to the corresponding master device through the last two pairs of lanes 516.

Meanwhile, although it is not shown in the drawing, the channels may not be assigned to be different according to the master device that obtains the master chip, and data communication with the slave devices may be performed through a common channel. In this case, a period of using time may be configured according to each device to avoid a conflict of data communication, and the common channel may be configured to be different according to each slave device.

The Third Embodiment

The first and the second embodiments disclose a plurality of devices constituting the wireless communication system, which are connected in series with each other. In this case, if any one of the serially connected devices malfunctions, the transmission and reception of data between the previous devices and the subsequent devices is impossible. Therefore, the wireless communication system may be extended to a configuration that is comprised of two or more devices that are connected with one device in parallel. At this time, one of the slave device or the master device may be connected in parallel. The third embodiment of the present invention introduces soft switches (SW) for the extended configuration. The soft switch may disconnect a currently connected device and connect another device according to the control of the master device.

Figure 6A:
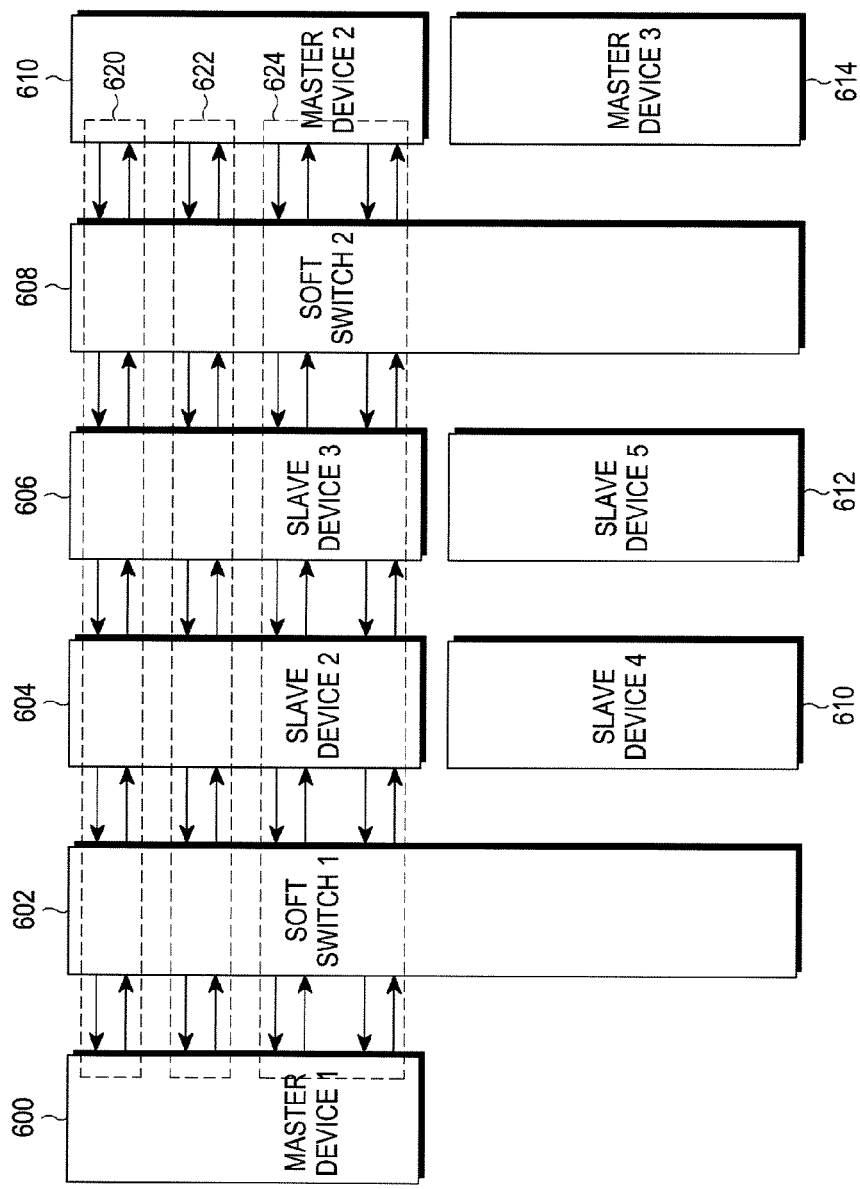
FIG. 6a illustrates an example of extension of a wireless communication system comprised of a plurality of devices according to an embodiment of the present invention.

FIG. 6a illustrates an example of an extension of a wireless communication system comprised of a plurality of devices according to an embodiment of the present invention.

Referring to FIG. 6a, the master device 1 (600) and the master device 2 (610) are connected with two slave devices, i.e., the slave device 2 (604) and the slave device 3 (606). Here, for example, it is assumed that when the master device 1 (600) obtains the master chip, it assigns the first pair of lanes 620 among four pairs of lanes provided in the master device 1 (600) as the channel for transferring the control information and channel information to the devices that are connected in series thereto. In addition, it is assumed that when the master device 2 (610) obtains the master chip, it assigns the second pair of lanes 622 as the channel for transferring the control information and channel information to the devices connected in series thereto. Finally, it is assumed that the remaining two pairs of lanes of the four pairs of lanes are assigned as the channels through which a result of the operation corresponding to the control message is received from the serially connected slave devices to the master device 1 (600) or the master device 2 (610). In addition, the soft switch 1 (602) and the soft switch 2 (608) are provided at the position of the previous device of the slave device 2 (604) and at the position of the subsequent device of the slave device 3 (606), respectively.

The soft switch 1 (602) and the soft switch 2 (608) each may connect the slave device 4 (610) instead of the slave device 2 (604) to the master device 1 (600), or may connect the slave device 5 instead of the slave device 3 (606) to the master device 2 (610), according to the instruction of the master device 1 (600) or the master device 2 (610).

Figure 6B:
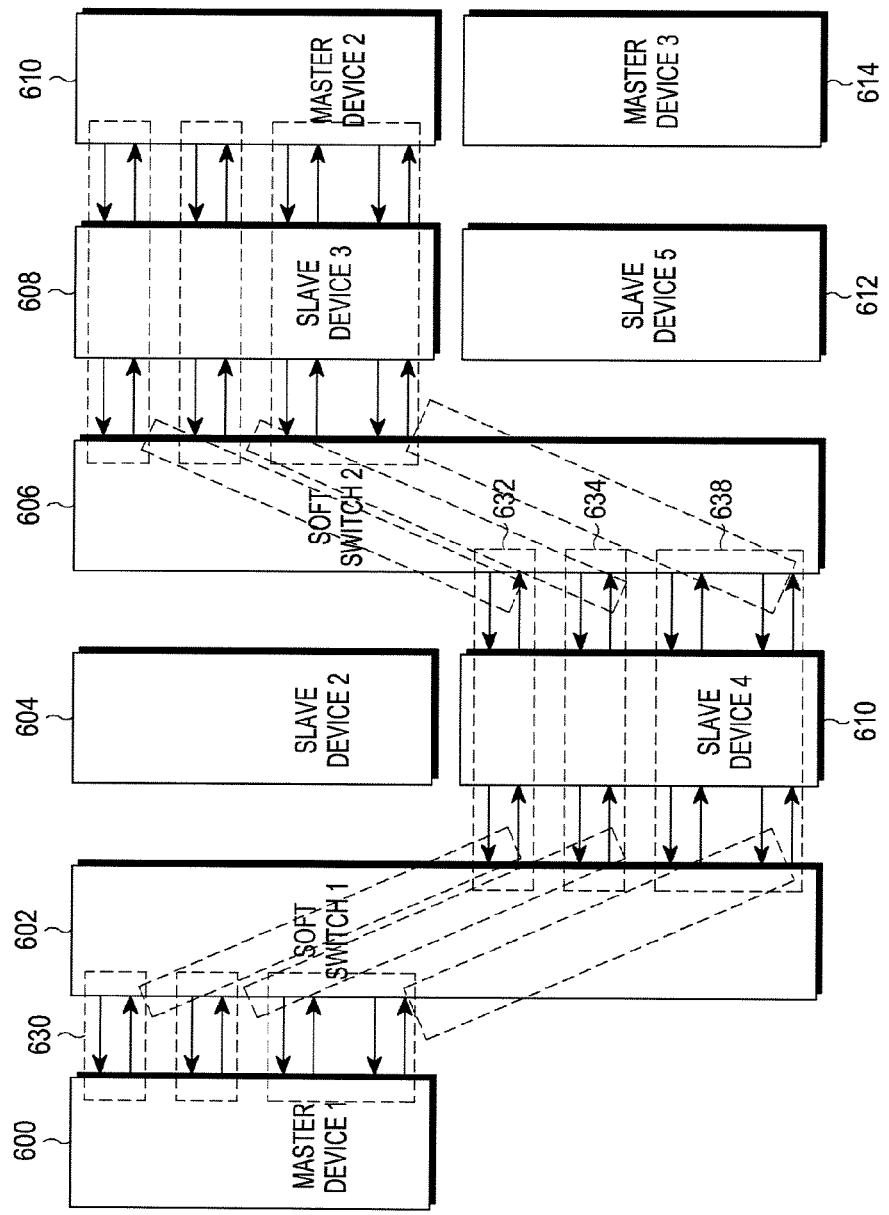
FIG. 6b illustrates an example of using soft switches in an extended wireless communication system comprised of a plurality of devices according to an embodiment of the present invention.

FIG. 6b illustrates an example of using the soft switches in the extended wireless communication system comprised of a plurality of devices according to an embodiment of the present invention. Here, for convenience of explanation, it is assumed that the wireless communication system has been extended from the configuration of FIG. 6a.

Referring to FIG. 6b, it is assumed that the master device 1 (600) has recognized malfunction of the slave device 2 (604) because the response to the channel information, the control message, or the data, which had been transferred to the slave device 2 (604), has not been received within the time corresponding to a predetermined number of times an operation of the timer, as described in the first embodiment and the second embodiment above. In this case, the master device 1 (600) may make a detour around the slave device 2 (604) using the soft switch 1 (602) and the soft switch 2 (606) for communication with a device after the slave device 2 (604), i.e., the slave device 3 (608). As shown in FIG. 6b, the soft switch 1 (602) may manage the lanes, which are to be connected with a previous device, of the slave device 4 (610) in parallel to the slave device 2 (604) as well as the lanes, which are to be connected with a previous device, of the slave device 2 (604). Likewise, the soft switch 2 (606) may manage the lanes, which are to be connected with a subsequent device, of the slave device 4 (610) as well as the lanes, which are to be connected with a subsequent device, of the slave device 2 (604).

More specifically, the master device 1 (600) may transfer the control message to the soft switch 1 (602), which instructs the soft switch 1 (602) to connect with the slave device 3 (608). Then, the soft switch 1 (602) may break the previously established connection between the master device 1 (600) and the lanes, which are to be connected with a previous device, of the slave device 2 (604), and may connect the lanes of the master device 1 (600) with the lanes 632, 634, 638, and 640, which are to be connected with a previous device, of the slave device 4 (610) that is positioned in parallel to the slave device 2 (604). In addition, the soft switch 1 (602) may transfer the control message of the master device 1 (600) to the soft switch 2 (606), which instructs the connection with the slave device 3 (608). Then, the soft switch 2 (606) may connect the lanes for a subsequent device of the slave device 4 (610) with the lanes for a previous device of the slave device 3 (608). Accordingly, the master device 1 (600) may control the soft switch 1 (602) and the soft switch 2 (606) to thereby change the connection with the slave device 3 (608) through the slave device 2 (604) into the connection with the slave device 3 (608) through the slave device 4 (610) by making a detour.

Figure 6C:
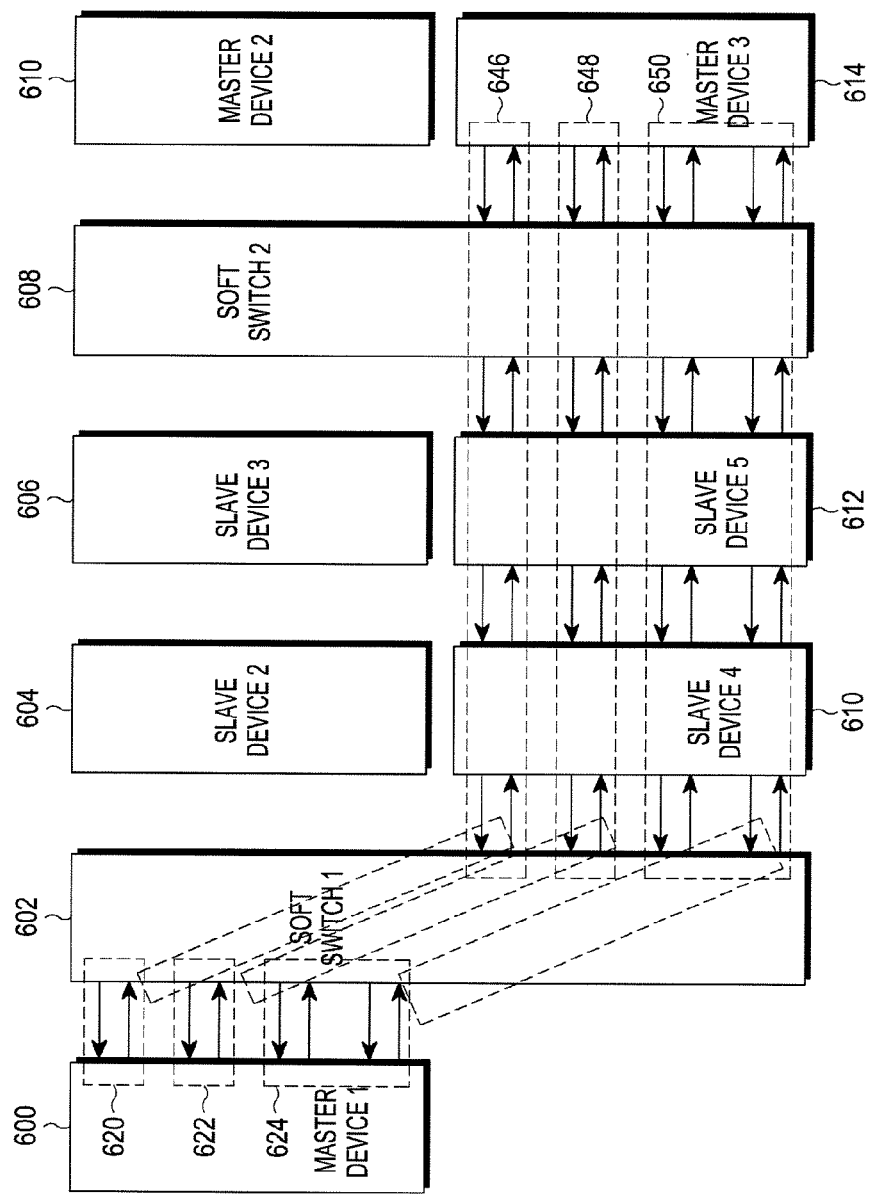
FIG. 6c illustrates another example of using soft switches in an extended wireless communication system comprised of a plurality of devices according to an embodiment of the present invention.

FIG. 6c illustrates another example of using the soft switches in the extended wireless communication system comprised of a plurality of devices according to an embodiment of the present invention. Here, for convenience of explanation, it is assumed that the wireless communication system has been extended from the configuration of FIG. 6a.

Referring to FIG. 6c, it is assumed that the master device 1 (600) has determined an extension of a data path with respect to the master device 3 (650). In this case, the master device 1 (600) may transmit control message that instructs the soft switch 1 (602) to make an extension of a data path with respect to the master device 3 (614). For example, the soft switch 1 (602) that has received the control message may connect the channels 620, 622, and 624, which are established in FIG. 6a, of the master device 1 (600) with the lanes for a previous device of the slave device 4 (610) in order to establish a path to the master device 3 (614). In addition, the soft switch 1 (602) may transfer the control message to the soft switch 2 (608). Accordingly, the soft switch 2 (608) may complete the establishment of the channel with the master device 3 (614) by connecting the lanes of the slave device 5 (612) that is connected in series with the slave device 4 (610). Consequently, three channels are established between the master device 1 (600) and the master device 3 (614). First, the channel 646 corresponding to the first pair of lanes of the master device 1 (600) may be assigned as the channel for transferring the control information and the channel information to the devices connected in series therewith when the master device 1 (600) obtains the master chip. In addition, when the master device 3 (614) obtains the master chip, the master device 3 (614) may assign the second pair of lanes 648 as the channel for transferring the control information and the channel information to the devices connected in series therewith. Finally, the remaining two pairs of lanes 650 may be assigned as the channel for transmitting a result of the operation corresponding to the control message from the serially connected slave devices to the master device 1 (600) or the master device 3 (614).

As shown in FIGS. 6b and 6c, the soft switches, according to the third embodiment of the present invention, when the master device recognizes malfunction of the device connected therewith, may be used to connect the master device with the subsequent one of the failed device by making a detour, or may be used to extend a data path of the master device.

Figure 7:
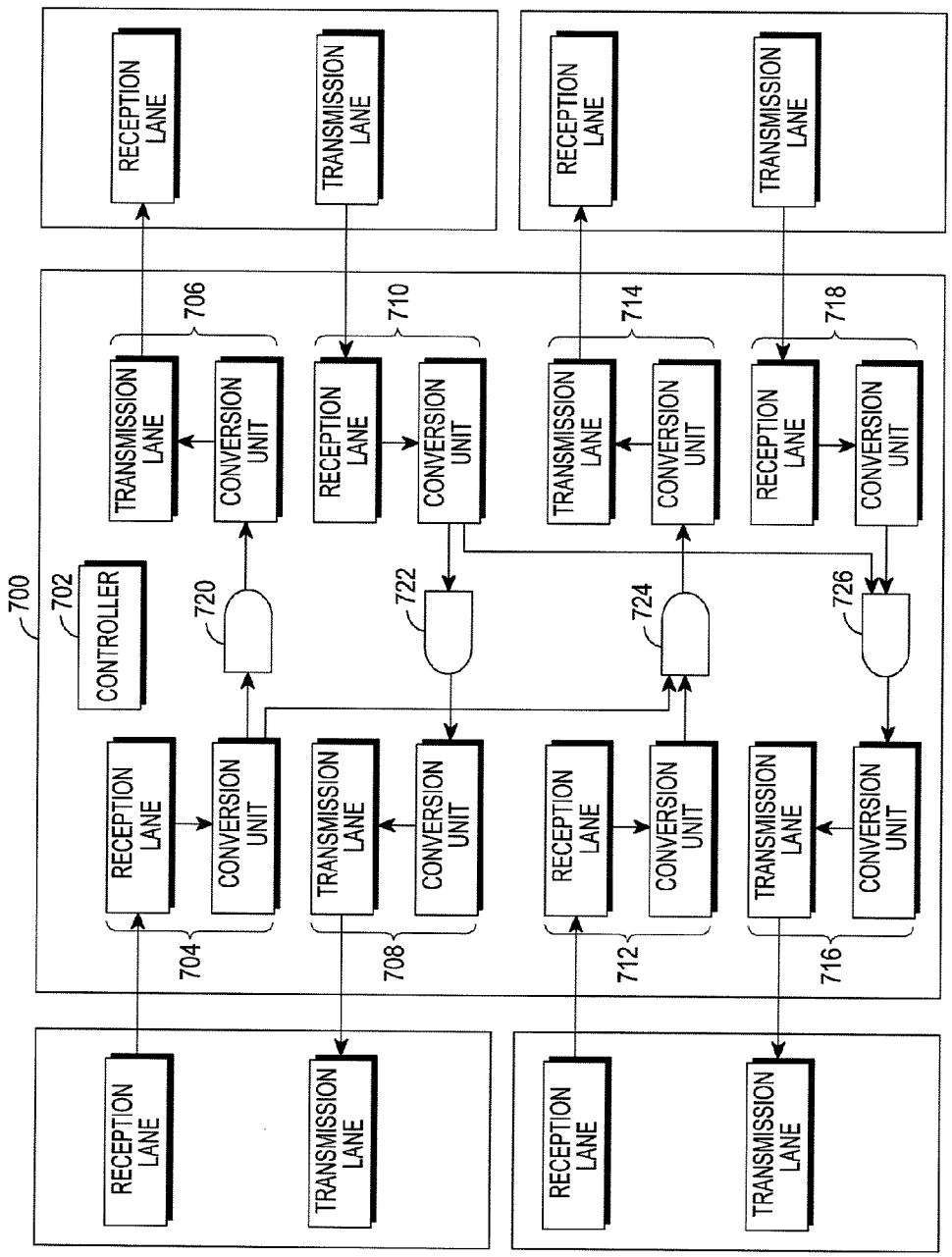
FIG. 7 is an internal configuration diagram of a slave device including a soft switch according to the third embodiment of the present invention.

FIG. 7 is an internal configuration diagram of a slave device including a soft switch according to the third embodiment of the present invention.

Referring to FIG. 7, here, the reference numeral 700 denotes an example of the extended configuration of the device according to the third embodiment of the present invention.

Referring to FIG. 7, the reference numerals 704 and 708 correspond to a single slave device that is connected with transmission and reception lanes of a previous device, and reference numerals 712 and 716 correspond to a single slave device as well. Likewise, the reference numerals 706 and 710 correspond to a single slave device that is connected with transmission and reception lanes of a subsequent device, and reference numerals 714 and 718 correspond to a single slave device as well. In addition, the reference numerals 720 to 728 correspond to soft switches. When the controller 702 receives the control message transferred from the master device, the soft switches change the lanes of currently connected devices according to the control message to thereby extend a data path of the master device, or to thereby change the typical path. Moreover, the transmission/reception lanes and the conversion units of the devices operate in the same manner as the slave devices of FIG. 3, so the detailed description thereof will be omitted here.

While the present invention has been shown and described with reference to certain embodiments thereof, it will be understood by those skilled in the art that various changes in form and details may be made therein without departing from the scope of the present invention. Thus, the scope of the present invention shall not be determined merely based on the described exemplary embodiments and rather determined based on the accompanying claims and the equivalents thereto.

The invention claimed is:

1. A method to control communication with a plurality of devices by a master device in a communication system, the method comprising:
    determining a channel to allocate between each of a plurality of slave devices and the master device;
    transmitting, to a first slave device connected to the master device, information related to the allocated channel;
    transmitting, to a second slave device connected to the first slave device, a channel setup request comprising channel information allocated to the second slave device; and
    receiving, from the second slave device, a response indicating a channel setup completion between the second slave device and the master device in a response to the channel setup request.

2. The method of claim 1, wherein the channel information indicates at least one lane pair among a plurality off lane pairs provided in the master device, the at least one lane pair is connected to at least one lane pair of the second slave device.

3. The method of claim 2, wherein the channel information further includes an available bandwidth of the master device, and identification information of each of the at least one lane pair.

4. The method of claim 2, wherein the channel setup request includes identification information of the second slave device, and identification information of a lane pair allocated to the second slave device among the plurality of lane pairs.

5. The method of claim 1, further comprising:
    transmitting, to the first slave device, a query asking whether there is another master device; and
    receiving, from the first slave device, a response indicating that there is the another master device in a response to the query,
    wherein the response includes identification information of the another master device.

6. The method of claim 5, wherein the response indicates that there is the another master device in a response to the query, and wherein the determining step comprises:
    determining the channel information of the second slave device, that are not duplicated with channel information of the another master device; and
    transmitting, to the another master device, the determined channel information of the second slave device.

7. The method of claim 1, further comprising:
    if the response of the second slave device is not received within a predetermined period of time, perform a connection with a third slave device connected to the second slave device.

8. The method of claim 1, wherein remaining lane pairs except for at least one lane pair indicated by the channel information among lane pairs between the first slave device and the second slave device are transited to a power saving state.

9. The method of claim 2, wherein each of the plurality of lane pairs is a pair of an input physical lane and an output physical lane.

10. A method for communicating with a plurality of devices by a first slave device in a communication system, the method comprising:
    receiving, from a master device connected to the first slave device, channel information allocated between each of a plurality of slave devices and the master device;
    receiving, from the master device, a channel setup request;
    determining whether identification information of the first slave device is included in the channel setup request;
    if the identification information of the first slave device is included in the channel setup request, setting up a channel between the master device and the first slave device based on channel information obtained from the channel setup request, and
    in a response to the channel setup request, transmitting, to the master device, a response indicating a channel setup completion between the first slave device and the master device.

11. The method of claim 10, wherein if the identification information of the first slave device is not included in the channel setup request, transmitting, a second slave device connected to the first slave device, the channel setup request.

12. The method of claim 10, wherein the channel information includes an available bandwidth of the master device, and identification information of all respective pairs of lanes.

13. The method of claim 10, wherein the setting up the channel comprises:
identifying a channel allocated to the first slave device from the channel information;
wherein remaining lane pairs except for at least one lane pair corresponding to the channel among lane pairs between the first slave device and a second slave device are transited to a power saving state,
wherein each of the lane pairs is a pair of an input physical lane and an output physical lane.

14. A master device to control communication with a plurality of devices in a communication system, the master device comprising:
a controller configured to determine a channel to allocate between each of a plurality of slave devices and the master device; and
a transceiver configured to transmit, to a first slave device connected to the master device, information related to the allocated channel, transmit, to a second slave device connected to the first slave device, a channel setup request comprising channel information allocated to the second slave device, and receive, from the second slave device, a response indicating a channel setup completion between the second slave device and the master device in a response to the channel setup request.

15. The master device of claim 14, wherein the channel information indicates at least one lane pair among a plurality of lane pairs provided in the master device, the at least one lane pair is connected to at least one lane pair of the second slave device.

16. The master device of claim 15, wherein the channel information includes an available bandwidth of the master device, and identification information of each of the at least one lane pair.

17. The master device of claim 15, wherein the channel setup request includes identification information of the second slave device, and identification information of a lane pair allocated to the second slave device among the plurality of lane pairs.

18. The master device of claim 14, wherein the transceiver is configured to transmit, to the first slave device, a query asking whether there is another master device, and receive, from the first slave device, a response indicating that there is the another master device in a response to the query,
wherein the response includes identification information of the another master device.

19. The master device of claim 18, wherein the response indicating that there is the another master device in a response to the query, the controller is configured to determine the channel information of the second slave device, that are not duplicated with channel information of the another master device, and control the transceiver to transmit, to the another master device, the determined channel information of the second slave device.

20. The master device of claim 14, wherein if the response of the second slave device is not received within a predetermined period of time, the controller is configured to perform a connection with a third slave device connected to the second slave device.

21. The master device of claim 14, wherein remaining lane pairs except for at least one lane pair indicated by the channel information among lane pairs between the first slave device and the second slave device are transited to a power saving state.

22. The master device of claim 15, wherein each of the plurality of lane pairs is a pair of an input physical lane and an output physical lane.

23. A first slave device for communicating with a plurality of devices by a first slave device, the first slave device comprising:
a transceiver configured to receive, from a master device connected to the first slave device, channel information allocated between each of a plurality of slave devices and the master device, and receive, from the master device, a channel setup request; and
a controller configured to determine whether identification information of the first slave device is included in the channel setup request, if the identification information of the first slave device is included in the channel setup request, set up a channel between the master device and the first slave device based on channel information obtained from the channel setup request, and in a response to the channel setup request, transmit, to the master device, a response indicating a channel setup completion between a second slave device and the master device.

24. The first slave device of claim 23, wherein if the identification information of the first slave device is not included in the channel setup request, the transceiver is configured to transmit, a second slave device connected to the first slave device, the channel setup request.

25. The first slave device of claim 23, wherein the channel information includes an available bandwidth of the master device, and identification information of all respective pairs of lanes.

26. The first slave device of claim 23, wherein the controller is configured to identify a channel allocated to the first slave device from the channel information,
wherein remaining lane pairs except for at least one lane pair corresponding to the channel among lane pairs between the first slave device and the second slave device are transited to a power saving state, and
wherein each of the lane pairs is a pair of an input physical lane and an output physical lane.

* * * * *